(12) United States Patent
Olden (10) Patent No.: US 6,170,688 B1
(45) Date of Patent: Jan. 9, 2001

(54) CRATING METHODS AND APPARATUS

(75) Inventor: Michael Marc Olden, Pacific, MO (US)

(73) Assignee: MiTek Holdings, Inc., Wilmington, DE (US)

( * ) Notice: Under 35 U.S.C. 154(b), the term of this patent shall be extended for 0 days.

(21) Appl. No.: 08/851,975

(22) Filed: May 6, 1997

(51) Int. Cl.⁷ ................................................ B65D 21/00
(52) U.S. Cl. ............................ 220/7; 217/48; 217/45
(58) Field of Search ............................ 220/6; 217/48, 217/45–47

(56) References Cited

U.S. PATENT DOCUMENTS

| | | | |
|---|---|---|---|
| 582,229 | * | 5/1897 | Reynolds .................................. 220/6 |
| 1,505,284 | * | 8/1924 | O'Hare ..................................... 220/6 |
| 1,601,168 | * | 9/1926 | Felten et al. ............................. 220/6 |
| 1,648,025 | * | 11/1927 | Molloy ..................................... 220/6 |
| 1,755,470 | * | 4/1930 | Cooper ..................................... 220/6 |
| 2,212,790 | * | 8/1940 | O'Meara ................................... 220/7 |
| 2,272,020 | * | 2/1942 | Ridge ...................................... 217/48 |
| 2,525,838 | * | 10/1950 | Smith et al. ............................. 220/6 |
| 2,672,252 | * | 3/1954 | Frear ....................................... 217/48 |
| 2,799,420 | * | 7/1957 | Dedmon .................................. 217/48 |
| 3,085,706 | * | 4/1963 | Rawle ..................................... 217/48 |
| 3,194,425 | * | 7/1965 | Muirhead ............................... 217/47 |
| 3,493,141 | * | 2/1970 | Salter ..................................... 217/48 |
| 3,497,127 | * | 2/1970 | Box ........................................ 220/7 |
| 3,587,903 | * | 6/1971 | Rustin, Jr. .............................. 217/48 |
| 5,114,034 | * | 5/1992 | Miller et al. ............................ 220/7 |
| 5,501,354 | * | 3/1996 | Stromberg .............................. 220/7 |
| 5,671,857 | * | 9/1997 | Stromberg .............................. 220/7 |

FOREIGN PATENT DOCUMENTS 861 322 * 11/1939 (FR) ..................................... 217/47

* cited by examiner

Primary Examiner—Joseph M. Moy
(74) Attorney, Agent, or Firm—Armstrong Teasdale LLP (57) ABSTRACT

In one aspect, the present invention relates to a crate subassembly including four side units, and each side unit has a top cord, a bottom cord, and vertical cords extending between and secured to the top and bottom cords. The top cord and bottom cord of each side unit extend substantially parallel to each other, and each side unit further includes a diagonal cord extending from and connected to the top and bottom cords. Connector plates are located to connect the respective adjacent vertical cords of each side unit, as well as to secure each side unit cord. When it is desired to form a crate, and by simply separating opposing side units, the subassembly is opened. When opening, the connector plates on the inner surface of the subassembly flex, or bend, and the connector plates have sufficient rigidity so that once opened, the subassembly does not close on itself during handling. With the subassembly in the open condition, the subassembly is readily secured to a pallet using, for example, screws. The above described subassembly enables safe, easy, and fast assembly of sturdy and reusable crates. In addition, such subassembly is low in cost and does not easily collapse.

33 Claims, 5 Drawing Sheets

CRATING METHODS AND APPARATUS

FIELD OF THE INVENTION

This invention relates generally to crates for packaging items such as generators, appliances, and tubs and, more particularly, to methods and apparatus for packaging such items in crates.

BACKGROUND OF THE INVENTION

Many items fabricated or assembled at a plant must be packaged for shipment upon completion of the fabrication or assembly processes. Although such packaging is necessary, the time and costs associated with packaging items do not relate directly to the manufacture of core products. Therefore, in an effort to maintain a focus on core product production, many manufacturers seek to reduce the time and costs associated with packaging so that resources can be directed to the core manufacturing activities.

Corrugated boxes are well known and facilitate reducing the packaging time and costs. Specifically, such boxes generally are not expensive and are easily and quickly assembled. Although corrugated boxes provide some protection against damage for some items, such boxes lack the strength and rigidity needed for heavy items such as appliances. In addition, such boxes generally are not reusable and are discarded after one delivery.

With heavier items such as heavy machinery (e.g., generators), fragile items, and appliances, such items typically are built on pallets and then upon completion of the manufacturing process, a crate is built around the items using the pallet as a base. For example, and with respect to a generator, the generator typically is assembled on a pallet and upon completion of the generator assembly process, crate side units are stapled (e.g., using a staple gun) to the pallet and to each other. A top may then be located over the side members and stapled to the side member edges. Crates fabricated in this manner have been used for many years.

Typically, and to increase productivity, two workers having staple guns assemble the crate. At various times during the crate assembly process, one worker will be shooting staples into the pallet in a direction toward the other worker. Of course, workers recognize the hazard and wear protective clothing and eye protection. In spite of the precautions and protection measures, having one worker shoot staples in the direction of another worker remains hazardous and it would be desirable to eliminate this situation. In addition, having workers assigned to building such crates is expensive in terms of labor costs. Further, since staples are used in the assembly process, such crates generally are not reusable and typically are discarded after one delivery.

In an attempt to reduce at least the labor costs associated with assembling crates, a known crate subassembly includes four side units preassembled and interconnected using nylon straps. The nylon straps are used so that the side units can be easily and quickly arranged around a pallet. While this known subassembly does provide some advantages, the subassembly is flimsy and may collapse on a worker when attempting to position the subassembly around a pallet. In addition, some stapling must be done in order to secure the subassembly to a pallet. The known subassembly also is not reusable and typically is discarded after one delivery.

Accordingly, it would be desirable to provide methods and apparatus which enable safe, easy, and fast assembly of sturdy and reusable crates. It also would be desirable to provide a crate subassembly which is low in cost and does not easily collapse during assembly.

SUMMARY OF THE INVENTION

These and other objects may be attained by a crate which includes a crate subassembly constructed in accordance with the present invention. Particularly, in one aspect, the present invention relates to a crate subassembly including four side units, and each side unit has a top cord, a bottom cord, and vertical cords extending between and secured to the top and bottom cords. The top cord and bottom cord of each side unit extend substantially parallel to each other, and each side unit further includes a diagonal cord extending from and connected to the top and bottom cords.

Connector plates are located to connect the respective adjacent vertical cords of each side unit. More particularly, on the inner surface of the subassembly, connector plates extend across the interfaces between adjacent vertical cords, and across the interfaces between vertical cords, top cords, bottom cords, and diagonal cords. In addition, a free end connector plate is located over and extends from the top cord of one end side unit, and a free end connector plate is located over and extends from the bottom cord of the other, opposing end side unit. Additional connector plates are located at the subassembly outer surface and extend across interfaces between vertical, diagonal and top cords, and across interfaces between vertical, diagonal and bottom cords. On the outer surface of the subassembly, however, no connector plate extends over the interface between adjacent vertical cords.

The arrangement is then located under a press, and the press is operated to embed the connector plates into the cords so that the connector plates partially extend into and securely engage the cords. The press is then withdrawn, and the end side units are folded over the intermediate side units until the end units are resting over the intermediate side units. In this position, the free end connector plates extend across the interface between the now adjacent vertical cords of the respective end units. The press is then again operated to press the folded subassembly so that the free end connector plates securely engage adjacent cords to complete fabrication of the subassembly.

For storage, many subassemblies can be stacked over each other in the folded condition to save space. When it is desired to form a crate, a subassembly can be removed from the stack and easily and quickly opened. More particularly, by simply separating opposing side units, the subassembly is opened. When opening, the connector plates on the inner surface of the subassembly flex, or bend, and the connector plates have sufficient rigidity so that once opened, the subassembly does not close on itself during handling. With the subassembly in the open condition, the subassembly is readily secured to a pallet using, for example, screws.

The above described subassembly enables safe, easy, and fast assembly of sturdy and reusable crates. In addition, such subassembly is low in cost and does not easily collapse.

DETAILED DESCRIPTION

Figure 1:
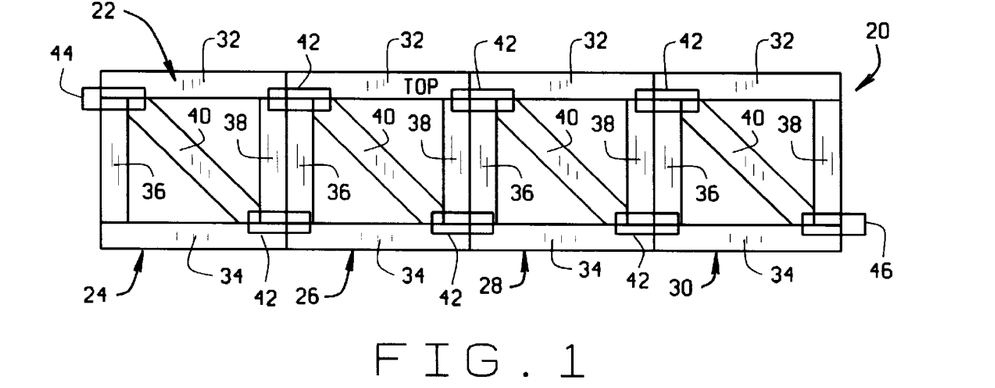
FIG. 1 is a top plan view of an inner surface of a crate subassembly constructed in accordance with one embodiment of the present invention.

FIG. 1 is a top plan view of a crate subassembly 20 constructed in accordance with one embodiment of the present invention. Crate subassembly 20 has an inner surface 22 and includes four side units 24, 26, 28 and 30 which may have many different alternative configurations. In the exemplary configuration shown in FIG. 1, each side unit 24, 26, 28 and 30 has a top cord 32, a bottom cord 34, and vertical cords 36 and 38 extending between and secured to top cord 32 and bottom cord 34. Side units 24 and 30 are sometimes referred to herein as end side units and side units 26 and 28 are sometimes referred to herein as intermediate side units.

Top cord 32 and bottom cord 34 of each side unit 24, 26, 28 and 30 extend substantially parallel to each other, and each side unit 24, 26, 28 and 30 further includes a diagonal cord 40 extending from and connected to bottom cord 34 and top cord 32. Although each side unit 24, 26, 28 and 30 is shown as having a construction identical to the construction of the other side units 24, 26, 28, and 30 of subassembly 20, it should be understood that side units 24, 26, 28 and 30 need not have such identical construction and the specific construction selected depends upon the desired size and strength of the crate to be assembled using subassembly 20.

Top, bottom, vertical and diagonal cords 32, 34, 36, 38 and 40 typically are fabricated from wood (e.g., plywood) such as 1"×4" or 2"×4" boards. Of course, the specific dimensions of the cords are selected based on the desired size and strength of the crate. The strength of a crate sometimes is referred to as the "burst" strength of the crate, and the cords are selected to satisfy the particular burst requirements for the crate to be constructed.

In addition, and with respect to spacing between adjacent side units 24, 26, 26, 28, 28, 30, and 24, 30, such units can be spaced apart in a range, for example, of approximately about 0" to 0.5", although it is contemplated that in some applications the spacing may be greater. Even with no spacing, i.e., spacing of 0", it has been found that side units 24, 26, 28 and 30 may rotate relative to each other to form a crate as described below. The spacing between side units 24, 26, 28 and 30 is selected based on the desired strength of the crate.

Referring still specifically to the exemplary embodiment illustrated in FIG. 1, connector plates 42 are located to connect the respective adjacent vertical cords 36 and 38. More particularly, connector plates 42 extend over the interfaces between adjacent vertical cords 36 and 38, and over the interfaces between vertical cords 36, 38, top cords 32, bottom cords 34, and diagonal cords 40. On inner surface 22 of subassembly 20, connector plates 42 therefore secure adjacent side units 24, 26, 28 and 30 together so as to prevent relative lateral movement between the adjacent side units yet allow relative rotational movement of the side units as described below.

In addition, a free end connector plate 44 is located over and extends from top cord 32 of end side unit 24, and a free end connector plate 46 is located over and extends from bottom cord 34 of opposing end side unit 30. As described below, free end connector plates 44 and 46 are utilized to complete the formation of subassembly.

Figure 2:
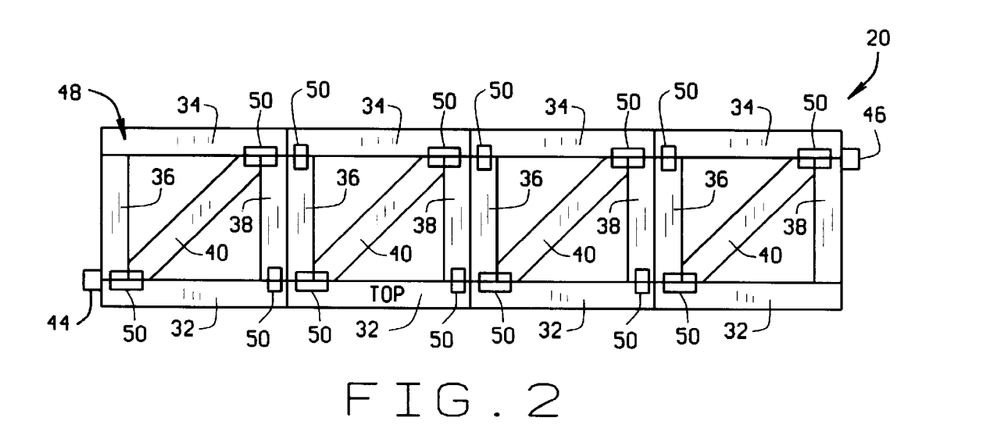
FIG. 2 is a top plan view of an outer surface of the crate assembly shown in FIG. 1.

FIG. 2 is a top plan view of an outer surface 48 of crate subassembly 20 shown in FIG. 1. As shown in FIG. 2, additional connector plates 50 are located at interfaces between vertical 36 and 38, diagonal 40 and top 32 cords, and are located at interfaces between vertical 36 and 38, diagonal 40 and bottom 34 cords. On outer surface 48 of subassembly 20, however, no connector plate extends over the interface between adjacent vertical cords 36 and 38.

Connector plates 42, 44, 46 and 50 are well known in the art, and the present invention is not limited to practice with any one particular connector plate. In an exemplary embodiment, connector plates 42, 44, 46 and 50 are the plates generally referred to as MII 20 connector plates commercially available from MiTek Industries, Inc., St. Louis, Mo. The particular plate selected depends on the size and strength of the crate to be formed. For example, the MII 20 connector plate is a "20 gauge" plate, and for some crates, other gauge connectors (e.g., 18 or 16 gauge connectors) may be required.

With respect to fabrication of subassembly 20, cords 32, 34, 36, 38 and 40 are pre-cut and then arranged on a work table relative to connector plates 42, 44, 46, and 50 in the arrangement shown in FIGS. 1 and 2. Particularly, top cords 32 are positioned end to end, bottom cords 34 are positioned end to end, and vertical 36 and 38 and diagonal 40 cords are positioned to extend between top and bottom cords 32 and 34. Connector plates 42 and 50 are located at the interfaces between top cords 32, bottom cords 34, diagonal cords 40, and vertical cords 36 and 38 as described above. In addition, free end connector plates 44 and 46 are positioned as shown and described in connection with FIGS. 1 and 2.

Figure 3:
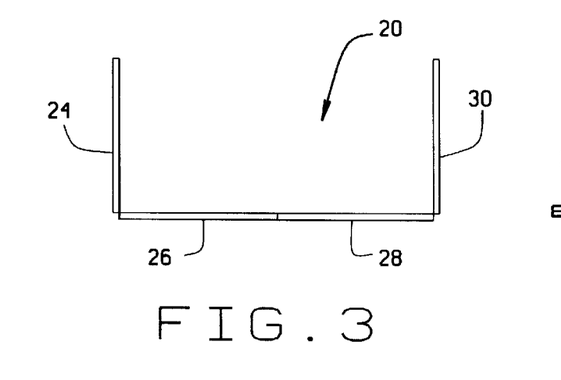
FIG. 3 is a side view of the crate subassembly shown in FIG. 1 in a partially folded condition.
Figure 4:
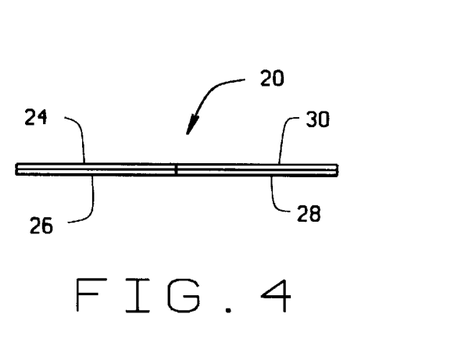
FIG. 4 is a side view of the crate subassembly shown in FIG. 1 in a completely folded condition.

The arrangement is then located under a vertical press, such as the Mark 100 vertical press commercially available from MiTek Industries, Inc., St. Louis, Mo. The press is then lowered so that connector plates 42, 44, 46 and 50 partially extend into and securely engage cords 32, 34, 36, 38 and 40. The press is then lifted. After connector plates 42, 44, 46 and 50 are pressed into engagement with cords 32, 34, 36, 38, and 40 as described above, and referring now to FIGS. 3 and 4, end side units 24 and 30 are folded (FIG. 3) over intermediate side units 26 and 38 until end units 24 and 30 are resting over intermediate units 26 and 28 (FIG. 4). In this position, free end connector plates 44 and 46 extend across the interface between now adjacent vertical cords 36 and 38 of respective end units 24 and 30 at subassembly inner surface 22. The press is then lowered to press folded subassembly 20 so that free end connector plates 44 and 46 securely engage adjacent cords 36 and 38 to complete fabrication of subassembly 20.

Of course, alternative methods can be utilized to fabricate subassembly 20. For example, rather than forming side units 24, 26, 28 and 30 in one press operation, each side unit 24, 26, 28 and 30 can be separately pressed and then the formed side units can be secured to each other in a subsequent pressing operation. In addition, the pressing operation for the folded subassembly can be performed simultaneously with the initial pressing operation. For this simultaneous pressing, the work table (or fixture) includes a stepped surface, and folded subassembly is located on the lower fixture surface and an unfolded subassembly is located on the upper fixture surface so that the uppermost surface of the folded subassembly lies on substantially the same plane as the uppermost surface of the unfolded subassembly. As a result, when the press is lowered, the press simultaneously engages both the folded and unfolded subassemblies. Further, rather than using a vertical press, other presses such as a roller press could be used for the pressing operation. Roller presses are known in the art.

Figure 5:
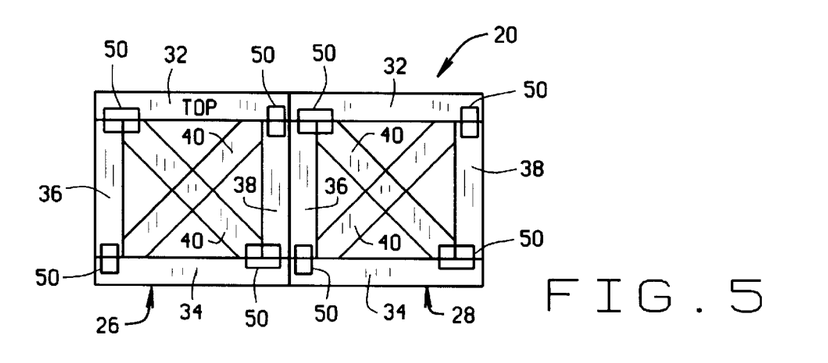
FIG. 5 is a top view of the completely folded crate assembly shown in FIG. 4.

FIG. 5 is a top view of folded subassembly 20 upon completion of the pressing operation. Many subassemblies 20 can be stacked over each other in the folded condition shown in FIG. 5 to save space. In addition, subassembly 20 can be easily and quickly opened to the position shown in FIG. 6 to form a crate.

Figure 6:
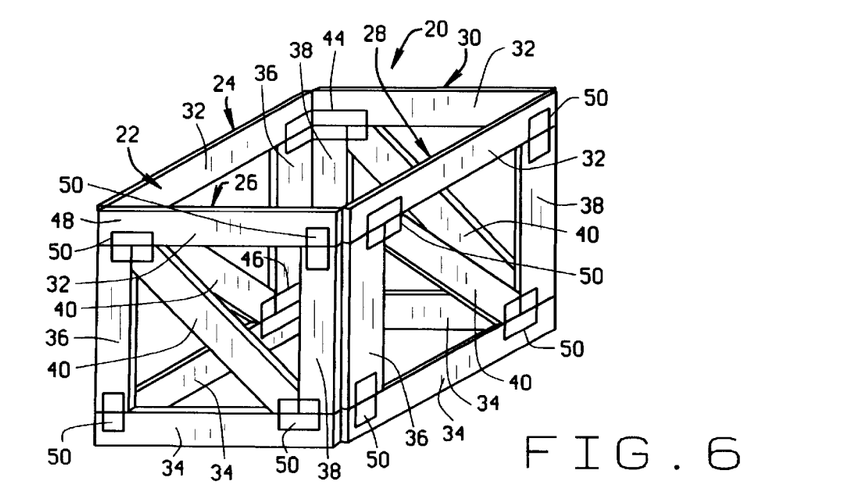
FIG. 6 is a perspective view of the crate assembly shown in FIG. 4 in an open condition.

More particularly, FIG. 6 is a perspective view of subassembly 20 in the open condition. By simply separating opposing side units 24 and 28, subassembly 20 can be easily and quickly opened. Connector plates 44, 46, and 42 on inner surface of subassembly 20 flex, or bend, and connector plates 44, 46, and 42 have sufficient rigidity so that once opened, subassembly 20 does not close on itself during handling.

With subassembly 20 in the open condition, subassembly 20 is readily secured to a pallet using, for example, screws. Subassembly 20 can be secured to the pallet at, for example, bottom cords 34 or vertical cords 36 and 38 depending upon the particular crate configuration desired. For example, known pallets typically have four outer side surfaces, and each side unit 24, 26, 28, and 30 of subassembly 20 can be positioned adjacent to one of the respective pallet side surfaces. At least one side unit 24, 26, 28, and 30 is then secured to the pallet using screws. If screws are utilized, subassembly 20 can easily be removed from the pallet and reused to form another crate.

Figure 7:
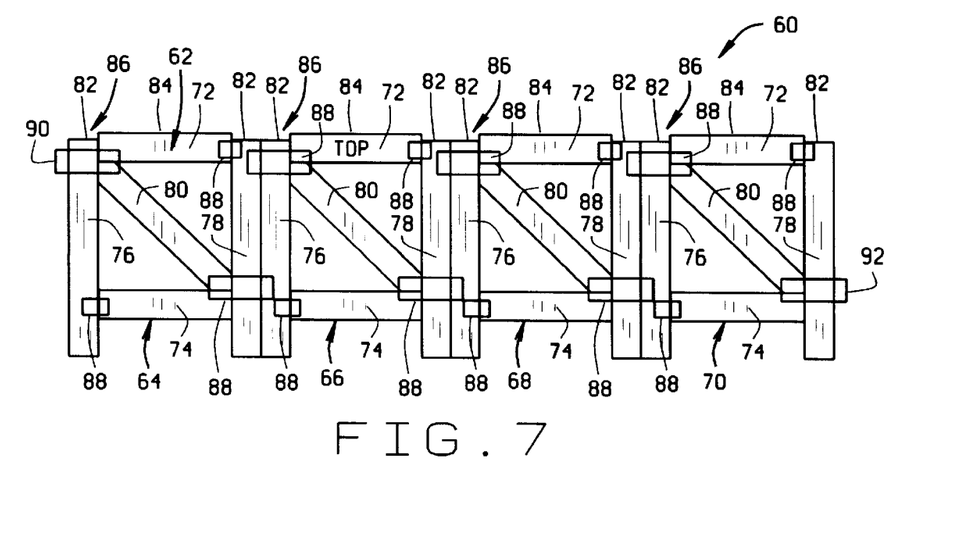
FIG. 7 is a top plan view of an inner surface of a crate subassembly constructed in accordance with another embodiment of the present invention.

FIG. 7 is a top plan view of a crate subassembly 60 constructed in accordance with another embodiment of the present invention. As with subassembly 20, crate subassembly 60 has an inner surface 62 and includes four side units 64, 66, 68, and 70 which may have many different alternative configurations. In the exemplary configuration shown in FIG. 7, each side unit 64, 66, 68, and 70 has a top cord 22, a bottom cord 74, and vertical cords 76 and 78 extending between and secured to top cord 72 and bottom cord 74. Top cord 72 and bottom cord 74 of each side unit 64, 66, 68 and 70 extend substantially parallel to each other, and each side unit 64, 66, 68, and 70 further includes a diagonal cord 80 extending from and connected to bottom cord 74 and top cord 72.

In subassembly 60, vertical cords 76 and 78 extend below bottom cords 74 and form subassembly legs. Also, upper surfaces 82 of vertical cords 76 and 78 are spaced below an upper surface 84 of top cords 72 to define notches 86. Notches 86 are useful when stacking open subassemblies 60.

Connector plates 88 are located to connect the respective adjacent vertical cords 76 and 78. More particularly, connector plates 88 extend over the interfaces between adjacent vertical cords 76 and 78, and over the interfaces between vertical cords 76 and 78, top cords 72, bottom cords 74, and diagonal cords 80. On inner surface 62 of subassembly 60, connector plates 88 therefore secure adjacent side units 64, 66, 68 and 70 together so as to prevent relative lateral movement between adjacent side units 64, 66, 68 and 70 yet allow relative rotational movement side units 64, 66, 68 and 70 as described below.

In addition, a free end connector plate 90 is located over and extends from top cord 72 of end side unit 64, and a free end connector plate 92 is located over and extends from bottom cord 74 of opposing end side unit 70. Free end connector plates 90 and 92 are utilized to complete the formation of subassembly 60 in the same manner as free end connector plates 44 and 46 (FIG. 1).

Figure 8:
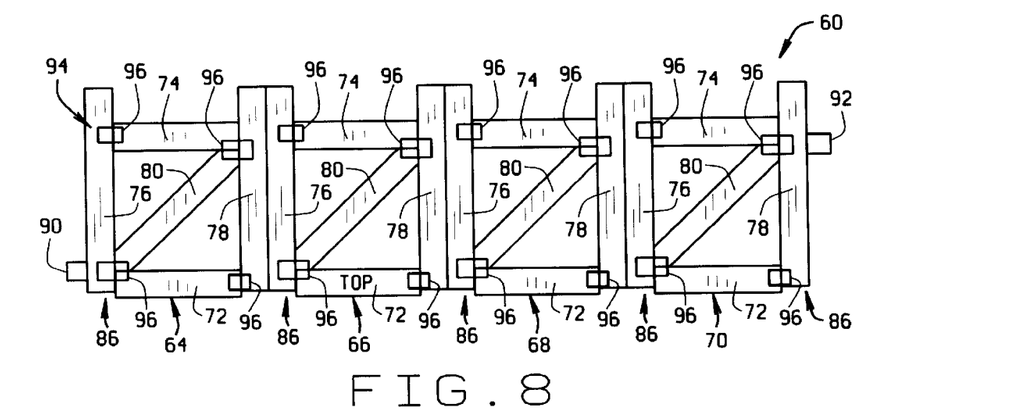
FIG. 8 is a top plan view of an outer surface of the crate assembly shown in FIG. 7.

FIG. 8 is a top plan view of an outer surface 94 of crate subassembly 60 shown in FIG. 7. As shown in FIG. 8, additional connector plates 96 are located at interfaces between vertical 76 and 78, diagonal 80 and top 72 cords, and are located at interfaces between vertical 76 and 78, diagonal 80 and bottom 74 cords. On outer surface 94 of subassembly 60, however, no connector plate extends over the interface between adjacent vertical cords 76 and 78.

Crate subassembly 60 is formed using a vertical press in the same manner as described above in connection with subassembly 20, and FIG. 9 is a perspective view of crate subassembly 60 in an open condition. By simply separating opposing side units 64 and 68, subassembly 60 can be easily and quickly opened. Connector plates 88, 90 and 92 on inner surface 62 of subassembly 60 flex, or bend, and connector plates 88, 90 and 92 have sufficient rigidity so that once opened, subassembly 60 does not close on itself during handling.

Figure 9:
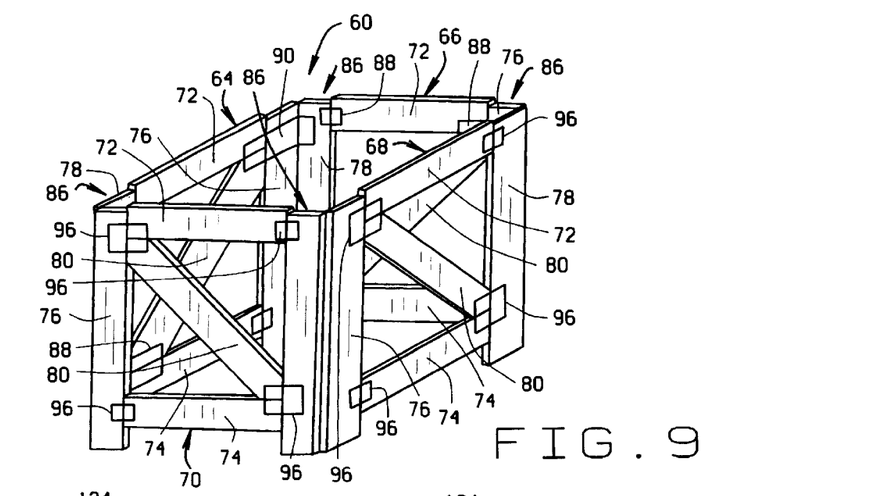
FIG. 9 is a perspective view of the crate assembly shown in FIG. 7 in an open condition.

With subassembly 60 in the open condition, subassembly 60 is readily secured to a pallet using, for example, screws. Subassembly 60 can be secured to the pallet at, for example, bottom cords 74 or vertical cords 76 and 78 depending upon the particular crate configuration desired. Subassembly 60 provides many of the same advantages of subassembly 20, with the additional advantage that subassembly 60 has integral legs for support.

Figure 10:
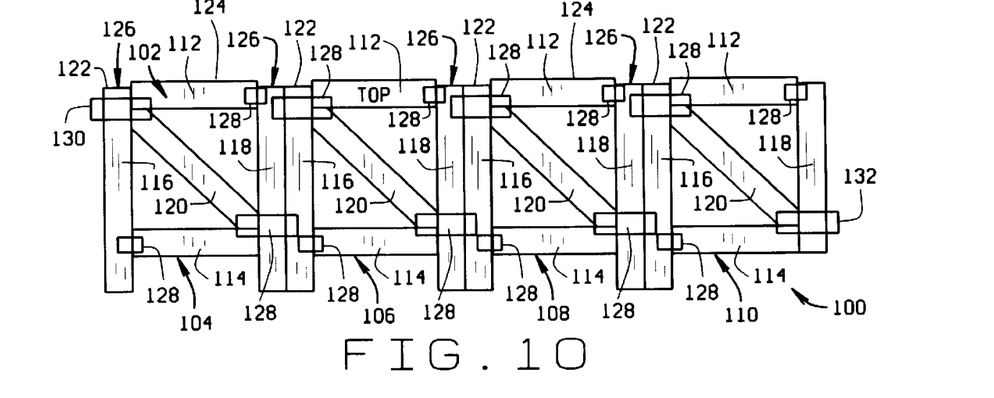
FIG. 10 is a top plan view of an inner surface of a crate subassembly constructed in accordance with yet another embodiment of the present invention.

FIG. 10 is a top plan view of a crate subassembly 100 constructed in accordance with yet another embodiment of the present invention. Crate subassembly 100 has an inner surface 102 and includes four side units 104, 106, 108 and 110 which may have many different alternative configurations. In the exemplary configuration shown in FIG. 10, each side unit 104, 106, 108 and 110 has a top cord 112, a bottom cord 114, and vertical cords 116 and 118 extending between and secured to top cord 112 and bottom cord 114. Top cord 112 and bottom cord 114 of each side unit 104, 106, 108 and 110 extend substantially parallel to each other, and each side unit 104, 106, 108, and 110 further includes a diagonal cord 120 extending from and connected to bottom cord 114 and top cord 112.

In subassembly, vertical cords 116 and 118 of end side unit 104 and intermediate side unit 108 extend below bottom cords 114 and form subassembly legs. Also, upper surfaces 122 of vertical cords 116 and 118 are spaced below an upper surface 124 of top cords 112 to define notches 126. Notches 126 are useful when stacking open subassemblies 100.

Connector plates 128 are located to connect the respective adjacent vertical cords 116 and 118. More particularly, connector plates 128 extend over the interfaces between adjacent vertical cords 116 and 118, and over the interfaces between vertical cords 116 and 118, top cords 112, bottom cords 114, and diagonal cords 120. On inner surface 102 of subassembly 100, connector plates 128 therefore secure adjacent side units 104, 106, 108 and 110 together so as to prevent relative lateral movement between adjacent side units 104, 106, 108, and 110 yet allow relative rotational movement side units 104, 106, 108, and 100.

In addition, a free end connector plate 130 is located over and extends from top cord 112 of end side unit 104, and a free end connector plate 132 is located over and extends from bottom cord 114 of opposing end side unit 110. As described below, free end connector plates 130 and 132 are utilized to complete the formation of subassembly 100.

Crate subassembly 100 is formed using a vertical press in the same manner as described above in connection with subassembly 20, and FIG. 11 is a perspective view of crate subassembly 100 in an open condition. Subassembly 100 includes connector plates 134 and outer surface 136. By simply separating opposing side units, subassembly 100 can be easily and quickly opened. Connector plates 128, 130 and 132 on inner surface 102 of subassembly 100 flex, or bend, and connector plates 128, 130 and 132 have sufficient rigidity so that once opened, subassembly 100 does not close on itself during handling.

Figure 11:
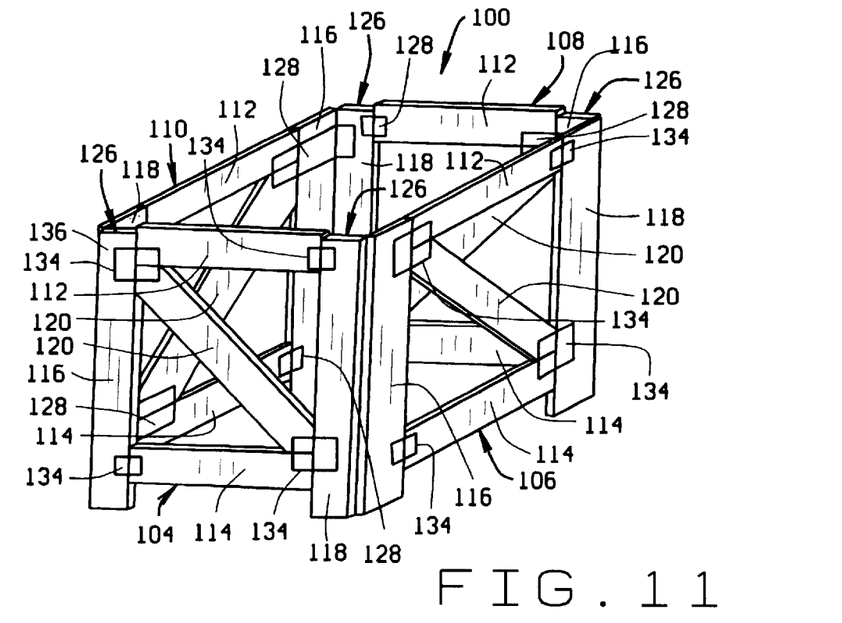
FIG. 11 is a perspective view of the crate assembly shown in FIG. 10 in an open condition.

With subassembly 100 in the open condition, subassembly 100 is readily secured to a pallet using, for example, screws. Subassembly 100 can be secured to the pallet at, for example, bottom cords 114 or vertical cords 116 and 118 depending upon the particular crate configuration desired. Subassembly 100 provides many of the same advantages of subassembly 20, with the additional advantage that subassembly 100 has integral legs for support.

Figure 12:
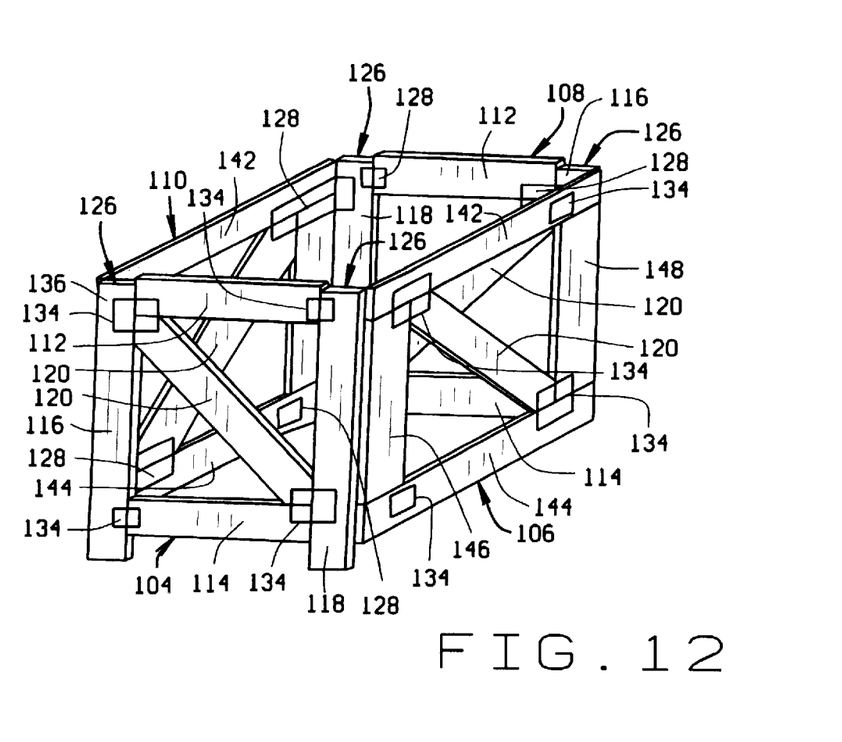
FIG. 12 is a perspective view of still yet another embodiment of a crate assembly in an open condition.

In subassembly 100, vertical cords 116 and 118 of intermediate unit 106 and end unit 110 extend substantially the entire vertical length of such units 106 and 110. An alternative subassembly 140 construction is shown in FIG. 12, wherein top and bottom cords 142 and 144 of units 106 and 110 extend substantially the entire lateral length of such units 106 and 110, and vertical cords 146 and 148 are shortened. Therefore, vertical cords 146 and 148 of intermediate side unit 106 and end side unit 110 are approximately about equal in the length but are not equal in length to vertical cords 116 and 118 end side unit 104 and intermediate side unit 108.

Figure 13:
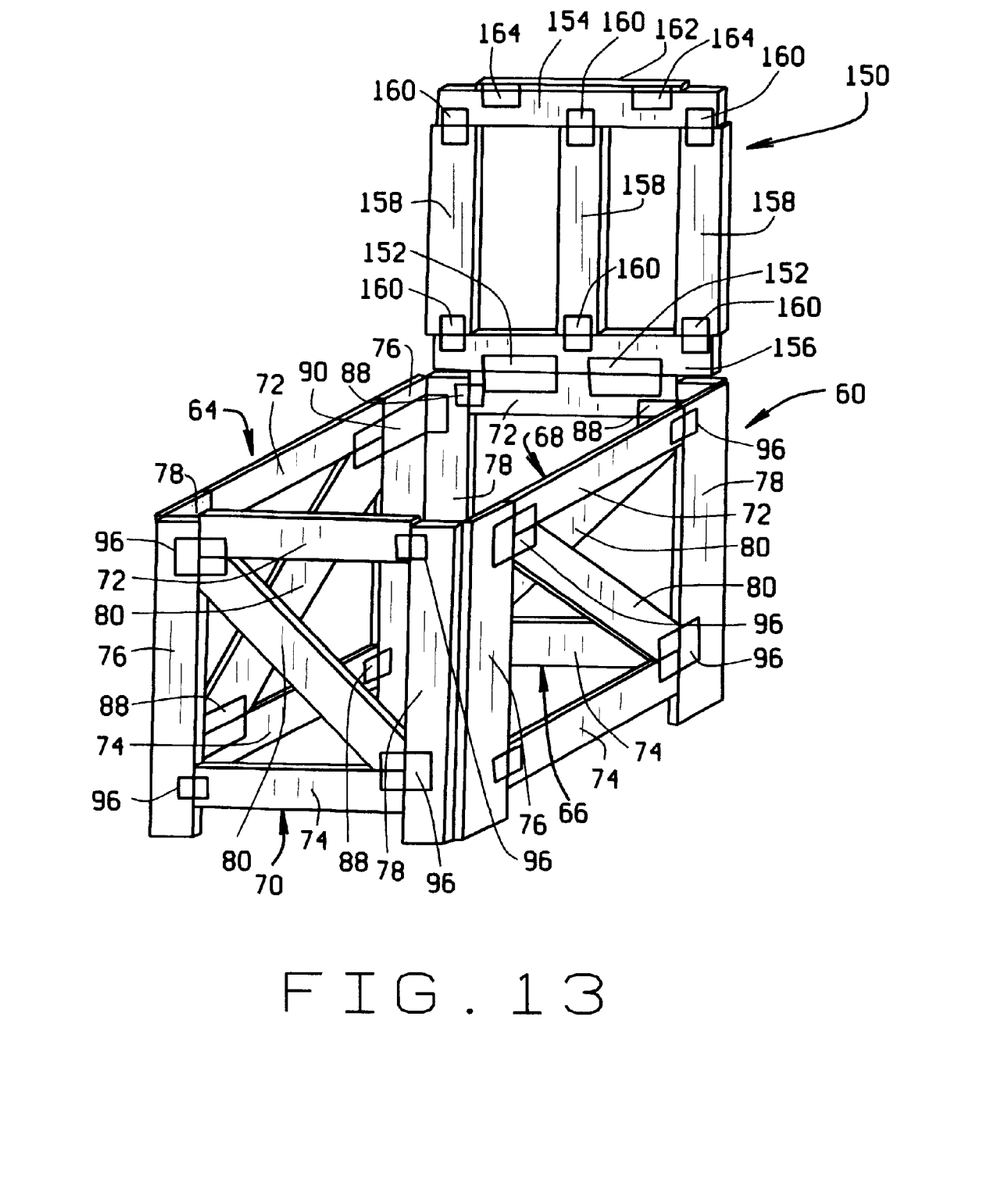
FIG. 13 is a perspective view of the crate assembly shown in FIG. 9 and including a top unit.

FIG. 13 is a perspective view of crate subassembly 60 shown in FIG. 9 and including a top unit 150. Top unit 150 is secured to side unit 66 by connector plates 152, and top unit 150 is rotatable relative to side unit 66. Top unit 150 includes first and second side cords 154 and 156, a plurality of elongate cords 158 extending between first and second side cords 154 and 156, and a plurality of connector plates 160 connect elongate cords 158 to first and second side cords 154 and 156. A handle cord 162 may be secured to side cord 154 by connector plates 164. Top unit 150 can be formed with side units 64, 66, 68 and 70 as described above by positioning cords 154, 156, 158, and 162 and connectors 152, 160, and 164 for top unit 150 adjacent to top cord 72 of unit 66 prior to the pressing operation.

As with the other subassemblies described above, subassemblies 60 including top unit 150 can be stored in a flattened, stacked relationship. With top unit 150, however, subassemblies 60 would be stacked in an alternating manner so that each top unit 150 of an upper subassembly 60 in the stack does not rest on the top unit of the subassembly immediately below such assembly.

Each of the above described subassemblies enables safe, easy, and fast assembly of sturdy and reusable crates. In addition, such subassemblies are low in cost and do not easily collapse during hand and assembly to a crate.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

What is claimed is:

1. A crate subassembly, comprising:
   a plurality of side units, each of said side units comprising a top chord, a bottom chord, and at least one vertical chord extending between and secured to said top chord and said bottom chord; and
   at least one connector plate connecting at least two of said side units, said at least one connector plate embedded into said at least two side units, said at least one connector plate having a planar configuration when embedded into said side units and subsequently bent to form a desired shape of said crate subassembly.

2. A crate subassembly in accordance with claim 1 wherein said at least one connector plate prevents substantial relative lateral movement between said two side units and allows relative rotational movement of at least one of said side units relative to the other said side unit.

3. A crate subassembly in accordance with claim 1 wherein a connector plate secures said at least one vertical cord to said top cord and a connector plate secures said at least one vertical cord to said bottom cord.

4. A crate subassembly in accordance with claim 1 wherein said top cord and said bottom cord extend substantially parallel to each other, and said side unit further comprises a diagonal cord extending from and connected to said bottom cord and said top cord.

5. A crate subassembly in accordance with claim 4 wherein a connector plate secures said diagonal cord to said top cord and a connector plate secures said diagonal cord to said bottom cord.

6. A crate subassembly in accordance with claim 1 wherein said vertical cord extends below said bottom cord and forms a subassembly leg.

7. A crate subassembly in accordance with claim 1 wherein each of said side units comprises at least a first vertical cord and a second vertical cord, said first vertical cord secured to first ends of said top and bottom cords and said second vertical cord secured to second ends of said top and bottom cords.

8. A crate subassembly in accordance with claim 7 wherein said first and second vertical cords of at least two of said side units extend below said bottom cord and form respective subassembly legs.

9. A crate subassembly in accordance with claim 8 wherein upper surfaces of said first and second vertical cords are spaced below an upper surface of said top cord to define a notch.

10. A crate subassembly in accordance with claim 7 wherein said first and second vertical cords of each of said side units extend below said bottom cord and form respective subassembly legs.

11. A crate subassembly in accordance with claim 10 wherein upper surfaces of said first and second vertical cords of each of said side units are spaced below an upper surface of said top cord to define a notch.

12. A crate subassembly in accordance with claim 7 wherein said first and second vertical cords of a first side unit are approximately about equal in length.

13. A crate subassembly in accordance with claim 12 wherein said length of said vertical cords of said first side unit are approximately about equal in length to first and second vertical cords of a second side unit.

14. A crate subassembly in accordance with claim 12 wherein said length of said vertical cords of said first side unit are not equal in length to first and second vertical cords of a second side unit.

15. A crate subassembly in accordance with claim 1 further comprising a top unit secured to at least one of said side units.

16. A crate subassembly in accordance with claim 15 wherein said top unit is secured to said side unit by at least one connector plate.

17. A crate subassembly in accordance with claim 15 wherein said top unit comprises first and second side cords and a plurality of elongate cords extending between and connected to said first and second side cords.

18. A crate subassembly in accordance with claim 17 wherein a plurality of connector plates connect said elongate cords to said first and second side cords.

19. A crate, comprising:

a pallet having four side surfaces;

four side units, each of said side units adjacent a respective one of said pallet side surfaces and comprising a top chord, a bottom chord, and at least one vertical chord extending between and secured to said top chord and said bottom chord; and at least four connector plates, each of said connector plates connecting one of said side units to another one of said side units, said connector plates embedded into said side units, said connector plates having a planar configuration when embedded into side units and subsequently bent to form a desired shape of said crate.

20. A crate in accordance with claim 19 wherein at least one of said side units is secured to said pallet.

21. A crate in accordance with claim 20 wherein said side unit is secured to said pallet by screws.

22. A crate in accordance with claim 19 wherein for at least one of said side units, a connector plate secures said at least one vertical cord to said top cord and a connector plate secures said at least one vertical cord to said bottom cord.

23. A crate in accordance with claim 19 wherein for at least one of said side units, said top cord and said bottom cord extend substantially parallel to each other, and said side unit further comprises a diagonal cord extending from and connected to said bottom cord and said top cord.

24. A crate in accordance with claim 23 wherein a connector plate secures said diagonal cord to said top cord and a connector plate secures said diagonal cord to said bottom cord.

25. A crate in accordance with claim 19 wherein said vertical cord extends below said bottom cord and forms a subassembly leg.

26. A crate in accordance with claim 19 wherein each of said side units comprises at least a first vertical cord and a second vertical cord, said first vertical cord secured to first ends of said top and bottom cords and said second vertical cord secured to second ends of said top and bottom cords.

27. A crate in accordance with claim 26 wherein said first and second vertical cords of at least two of said side units extend below said bottom cord and form respective subassembly legs.

28. A crate in accordance with claim 27 wherein upper surfaces of said first and second vertical cords are spaced below an upper surface of said top cord to define a notch.

29. A crate in accordance with claim 26 wherein said first and second vertical cords of each of said side units extend below said bottom cord and form respective subassembly legs.

30. A crate in accordance with claim 29 wherein upper surfaces of said first and second vertical cords of each of said side units are spaced below an upper surface of said top cord to define a notch.

31. A crate in accordance with claim 19 further comprising a top unit secured to at least one of said side units.

32. A crate in accordance with claim 31 wherein said top unit is secured to said side unit by at least one connector plate.

33. A crate in accordance with claim 32 wherein said top unit comprises first and second side cords, a plurality of elongate cords extending between said first and second side cords, and a plurality of connector plates connecting said elongate cords to said first and second side cords.

* * * * *